(12) United States Patent
Kim et al.

(10) Patent No.: US 10,400,065 B2
(45) Date of Patent: Sep. 3, 2019

(54) PHTHALONITRILE RESIN

(71) Applicant: LG Chem, Ltd., Seoul (KR)

(72) Inventors: Sang Woo Kim, Daejeon (KR); Seung Hee Lee, Daejeon (KR); Ki Ho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/524,497

(22) PCT Filed: Nov. 18, 2015

(86) PCT No.: PCT/KR2015/012419
§ 371 (c)(1),
(2) Date: May 4, 2017

(87) PCT Pub. No.: WO2016/080762
PCT Pub. Date: May 26, 2016

(65) Prior Publication Data
US 2017/0321007 A1 Nov. 9, 2017

(30) Foreign Application Priority Data

Nov. 18, 2014 (KR) .................. 10-2014-0160813
Nov. 17, 2015 (KR) .................. 10-2015-0161314

(51) Int. Cl.
*C08G 65/40* (2006.01)
*C08G 65/333* (2006.01)
(Continued)

(52) U.S. Cl.
CPC .......... *C08G 65/40* (2013.01); *C08G 65/333* (2013.01); *C08G 65/4006* (2013.01);
(Continued)

(58) Field of Classification Search
CPC ........ C08G 65/40; C08G 67/00; C08G 73/00; C08G 33/00
See application file for complete search history.

(56) References Cited

U.S. PATENT DOCUMENTS

| 5,389,441 A | 2/1995 | Keller |
| 5,965,268 A | 10/1999 | Sastri et al. |
| 6,001,926 A | 12/1999 | Sastri et al. |

FOREIGN PATENT DOCUMENTS

| CN | 103834008 A | 6/2014 |
| JP | 2005105193 A | 4/2005 |

(Continued)

OTHER PUBLICATIONS

Search report from International Application No. PCT/KR2015/012419, dated Mar. 7, 2016.

*Primary Examiner* — Shane Fang
(74) *Attorney, Agent, or Firm* — Lerner, David, Littenberg, Krumholz & Mentlik, LLP

(57) ABSTRACT

The present application relates to a phthalonitrile resin, a polymerizable composition, a prepolymer, a composite, a preparation method therefor, and a use thereof. The present application can provide: phthalonitrile having excellent curability, exhibiting a suitable process temperature and a wide process window, and capable of forming a composite having excellent physical properties; a polymerizable composition using the same; and a prepolymer.

20 Claims, 2 Drawing Sheets

(51) Int. Cl.
*C08G 65/48* (2006.01)
*C08J 5/24* (2006.01)
*C08J 5/04* (2006.01)

(52) U.S. Cl.
CPC ............... *C08G 65/48* (2013.01); *C08J 5/04* (2013.01); *C08J 5/24* (2013.01); *C08J 2379/00* (2013.01)

(56) References Cited

FOREIGN PATENT DOCUMENTS

| | | | | |
|---|---|---|---|---|
| JP | 2009-073738 | * | 9/2007 | ............. C07C 69/92 |
| KR | 20010030872 | | 4/2001 | |
| KR | 100525304 B1 | | 11/2005 | |
| KR | 100558158 B1 | | 3/2006 | |

* cited by examiner

[Figure 1]
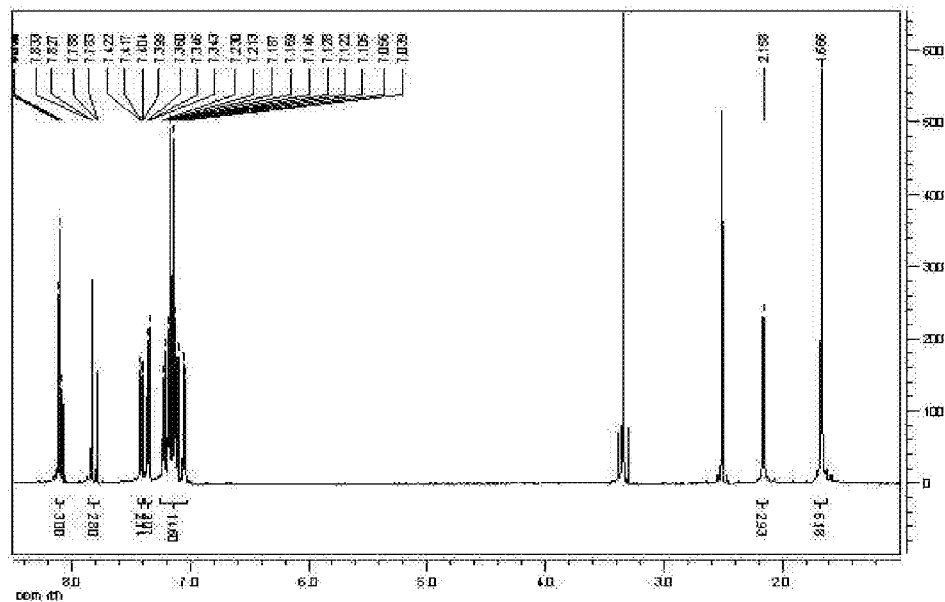
[Figure 2]
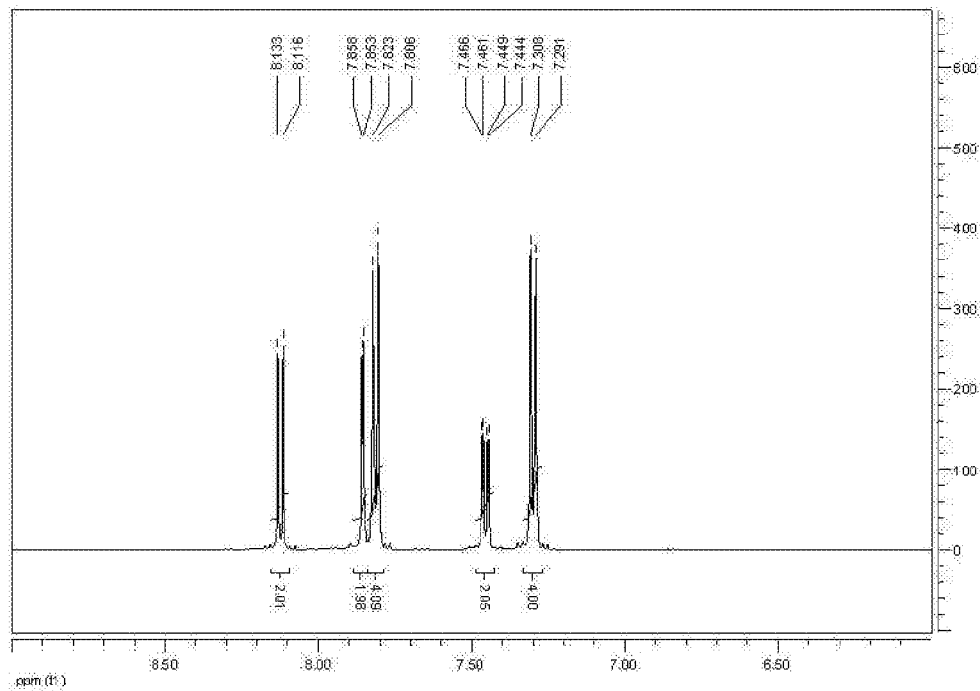

[Figure 3]
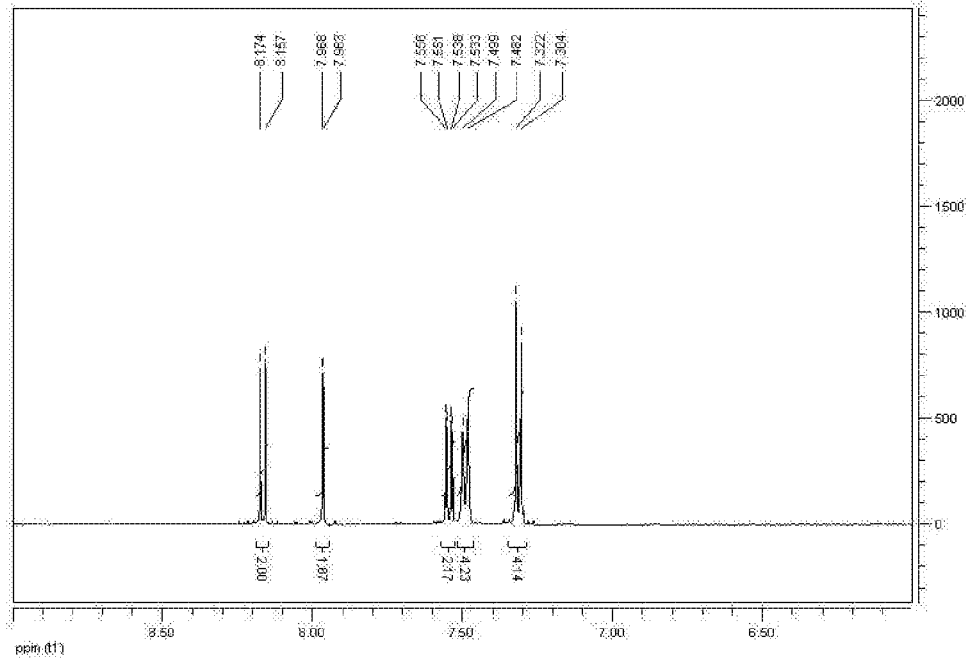
[Figure 4]
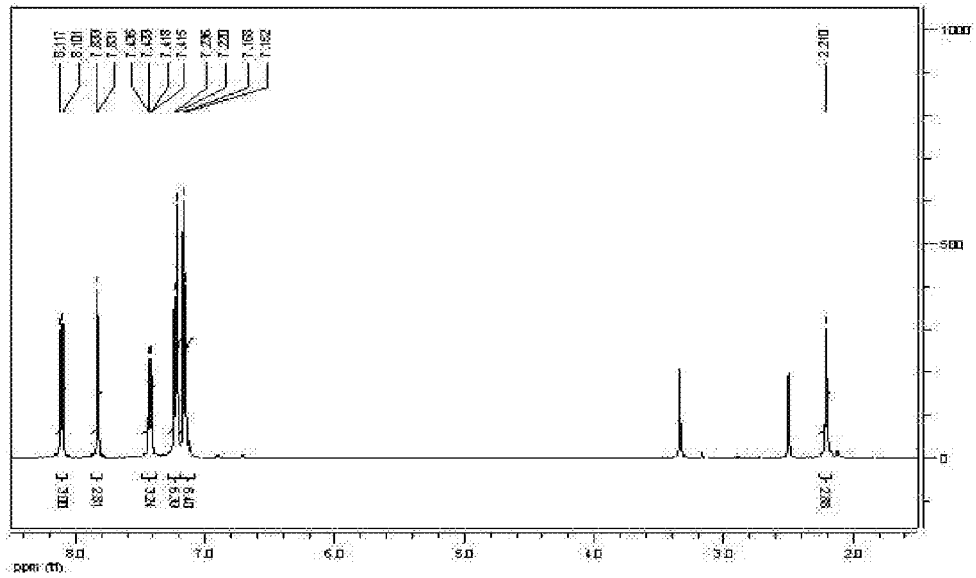

PHTHALONITRILE RESIN

CROSS-REFERENCE TO RELATED APPLICATIONS

The present application is a national phase entry under 35 U.S.C. § 371 of International Application No. PCT/KR2015/012419, filed on Nov. 18, 2015, published in Korean, which claims priority from Korean Patent Application No. 10-2014-0160813, filed on Nov. 18, 2014, and Korean Patent Application No. 10-2015-0161314, filed on Nov. 17, 2015, all of which are incorporated herein by reference.

TECHNICAL FIELD

The present application relates to a phthalonitrile resin, a polymerizable composition, a prepolymer, a composite, a preparation method therefor and a use thereof.

BACKGROUND ART

A phthalonitrile resin can be used for various applications. For example, a composite formed by impregnating a filler such as a glass fiber or a carbon fiber with the phthalonitrile resin may be used as a material, such as an automobile, airplane or ship. The procedure for preparing the composite can comprise, for example, mixing a mixture of phthalonitrile and a curing agent or a prepolymer formed by a reaction of the mixture and a filler, and then curing the resulting product. Such content is disclosed in Korean Patent Registration No. 0558158, etc.

To effectively achieve the procedure for preparing the composite, it is required that phthalonitrile as a monomer or a polymerizable composition or a prepolymer formed therefrom has suitable fusibility and fluidity and a so-called process window is wide.

In addition, when the mixture of phthalonitrile and a curing agent or the prepolymer includes voids or generates voids in a procedure of processing or curing, it is possible to cause decrease in the physical properties of the composite, so that such a problem should be also considered.

DISCLOSURE

Technical Problem

The present application provides a phthalonitrile resin, a polymerizable composition, a prepolymer, a composite, a precursor of the composite and a method for preparing the same and a use thereof.

The present application provides phthalonitrile exhibiting excellent curability, and an appropriate process temperature and a wide process window, and capable of forming a composite having excellent physical properties, a polymerizable composition and a prepolymer, using the same.

Technical Solution

The present application is directed to a phthalonitrile resin. The phthalonitrile resin may include polymerized units derived from a compound of Formula 1 below. In the present application, the term "polymerized units" derived from a certain compound may refer to a backbone of a polymer formed by polymerization or curing of the compound.

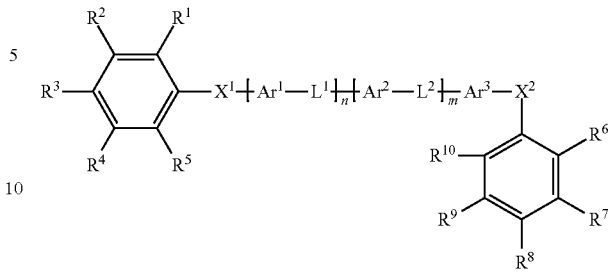

[Formula 1]

In Formula 1, $R^1$ to $R^{10}$ are each independently hydrogen, an alkyl group, an alkoxy group, an aryl group, or a cyano group, provided that at least two of $R^1$ to $R^5$ are a cyano group and at least two of $R^6$ to $R^{10}$ are a cyano group, $X^1$ and $X^2$ are each independently an alkylene group, an alkylidene group, an oxygen atom or a sulfur atom, $Ar^1$, $Ar^2$ and $Ar^3$ are the same or different aromatic divalent radical from one another, n is a number of 1 or more, m is a number of 1 or more, $L^1$ is an alkylene group or an alkylidene group, and $L^2$ is an alkylene group or an alkylidene group, substituted with a monovalent radical of Formula 2 below:

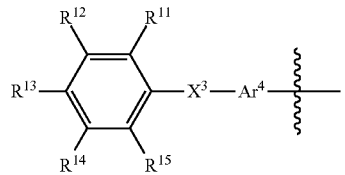

[Formula 2]

In Formula 2, $R^{11}$ to $R^{15}$ are each independently hydrogen, an alkyl group, an alkoxy group, an aryl group, or a cyano group, provided that at least two of $R^{11}$ to $R^{15}$ are a cyano group, $X^3$ is an alkylene group, an alkylidene group, an oxygen atom or a sulfur atom, and $Ar^4$ is an aromatic divalent radical.

In the present application, the term alkyl group may be an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be straight, branched or cyclic, and substituted by one or more substituents, if necessary.

In the present application, the term alkoxy group may be an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group may be straight, branched or cyclic, and substituted by one or more substituents, if necessary.

In the present application, the term aryl groups may mean a monovalent residue derived from a benzene ring, a compound comprising the benzene ring or any one derivative thereof, unless otherwise specified. The above compound comprising the benzene ring may mean a compound having a structure in which two or more benzene rings are condensed with sharing one or two carbon atoms or directly linked or a structure in which they are linked by a suitable linker. The compound as above may be exemplified by biphenyl or naphthalene. The aryl group may comprise, for example, 6 to 25, 6 to 20 or 6 to 12 carbon atoms. A specific type of aryl group may be exemplified by a phenyl group, a benzyl group, a biphenyl group or a naphthalenyl group and the like, without being limited thereto. In addition, the scope of the aryl group in the present application can also include a so-called aralkyl group or arylalkyl group as well as a functional group to be typically referred to as an aryl group.

In the present application, the term aromatic divalent radical, unless otherwise specified, may mean a divalent residue derived from a benzene ring, a compound comprising the benzene ring or any one derivative thereof, as described in the definitions of the aryl group. The aromatic divalent radical may comprise, for example, 6 to 25, 6 to 20 or 6 to 12 carbon atoms. A representative type of aromatic divalent radical may include, but is not limited thereto, a phenylene group.

In the present application, the term alkylene group or alkylidene group, unless otherwise specified, may mean an alkylene group or an alkylidene group, having 1 to 20 carbon atoms, 1 to 16 carbon atoms, 1 to 12 carbon atoms, 1 to 8 carbon atoms or 1 to 4 carbon atoms. The alkylene group or alkylidene group may be straight, branched or cyclic. In addition, the alkylene group or alkylidene group may be optionally substituted with one or more substituents.

In the present application, a substituent capable of being optionally substituted on the alkyl group, the alkoxy group, the aryl group, the aromatic divalent radical may be exemplified by halogen such as chlorine or fluorine, an epoxy group such as a glycidyl group, an epoxyallyl group, a glycidoxyalkyl group or an alicyclic epoxy group, an acryloyl group, a methacryloyl group, an isocyanate group, a thiol group, an alkyl group, an alkoxy group or an aryl group and the like, without being limited thereto.

In Formula 1, $R^1$ to $R^{10}$ are each independently hydrogen, an alkyl group, an alkoxy group, an aryl group, provided that at least two of $R^1$ to $R^5$ are a cyano group and at least two of $R^6$ to $R^{10}$ are a cyano group. In another example, $R^1$ to $R^{10}$ other than a cyano group may be each independently hydrogen, an alkyl group or an alkoxy group, or hydrogen or an alkyl group. In one example, in Formula 1, $R^3$, $R^4$, $R^8$ and $R^9$ may be a cyano group, and $R^1$, $R^2$, $R^5$, $R^6$, $R^7$ and $R^{10}$ may be each independently hydrogen, an alkyl group, an alkoxy or a aryl group, or hydrogen, an alkyl group or an alkoxy group, or a hydrogen or an alkyl group.

In Formula 1, $X^1$ and $X^2$ may be each independently an alkylene group, an alkylidene group, an oxygen atom or a sulfur atom, and in another example, may be an alkylene group, an alkylidene group or an oxygen atom, or an oxygen atom.

In Formula 1, $Ar^1$, $Ar^2$ and $Ar^3$ are the same or different aromatic divalent radical from one another, where the aromatic divalent radical may be, e.g., phenylene, without being limited thereto. In addition, in $Ar^1$ of Formula 1, a substitution position of $L^1$ may be an ortho, meta or para position based on $X^1$, for example a para position. In addition, in $Ar^2$ of Formula 1, a substitution position of $L^2$ may be an ortho, meta or para position based on $L^1$, for example a para position. In addition, in $Ar^3$ of Formula 1, a substitution position of $X^2$ may be an ortho, meta or para position based on $L^2$, for example a para position.

In Formula 1, n may be any number of 1 or more, and m may be any number of 1 or more. By being n and m 1 or more at the same time, the compound can exhibit appropriate process temperature and process window characteristics, while exhibiting excellent curability. If n and m in Formula 1 are 1 or more at the same time, as the number of phthalonitrile groups participating in the curing reaction is suitably maintained, the overall structure of the compound can be favorably maintained for the process temperature and process window characteristics. For example, when m is 0, the structure of the core portion in the compound may represent symmetry, with restricting the number of phthalonitrile groups included in the compound of Formula 1, whereby such symmetry causes increase of crystallinity and consequently results in increasing the process temperature such as a melting temperature and at the same time also deteriorates the process window characteristics. Furthermore, when n in Formula 1 is 0, the structure of the compound of Formula 1 may represent symmetry facilitating intermolecular superposition, whereby such symmetry causes increase of crystallinity and consequently induce increase of the process temperature (for example, melting temperature) and degradation of process window characteristics.

In another example, n in Formula 1 may be in a range of 1 to 10, 1 to 8, 1 to 6, 1 to 4 or 1 to 3, or 1 or 2.

In another example, m in Formula 1 may be in a range of 1 to 10, 1 to 8, 1 to 6, 1 to 4 or 1 to 3, or 1 or 2.

In Formula 1, $L^1$ may be an alkylene group or an alkylidene group, $L^2$ may be an alkylene group or an alkylidene group, substituted with the monovalent radical of Formula 2 above.

In Formula 2, $R^{11}$ to $R^{15}$ are each independently hydrogen, an alkyl group, an alkoxy group, an aryl group, or a cyano group, provide that at least two of $R^{11}$ to $R^{15}$ a cyano group. In another example, $R^1$ to $R^5$ other than a cyano group may be each independently hydrogen, an alkyl group or an alkoxy group, or hydrogen or an alkyl group. In one example, in Formula 2, $R^{13}$ and $R^{14}$ may be a cyano group and $R^{11}$, $R^{12}$ and $R^{15}$ may be each independently hydrogen, an alkyl group, an alkoxy group or an aryl group, or hydrogen, an alkyl group or an alkoxy group, or hydrogen or an alkyl group.

In Formula 2, $X^3$ may be an alkylene group, an alkylidene group, an oxygen atom or a sulfur atom, and in another example, may be an alkylene group, an alkylidene group or an oxygen atom, or an oxygen atom.

Furthermore, in Formula 2, $Ar^4$ is an aromatic divalent radical, where the aromatic divalent radical may be, for example a phenylene group, without being limited thereto. In addition, in $Ar^4$ of Formula 2, a substitution position of $X^3$ may be an ortho, meta or para position based on a site linked to $L^2$ of Formula 1, and for example a para position.

In Formula 2, a symbol

may mean that its site is linked to L of Formula 1.

In one example, the suitable compound may be a compound in which in Formula 1, $X^1$ and $X^2$ are an oxygen atom, $Ar^1$, $Ar^2$ and $Ar^3$ are a phenylene group, n is 1 or 2, and m is 1 or 2. In the above structure, in Formula 2, $Ar^4$ may be a phenylene group, and $X^3$ may be an oxygen atom. In such a compound, for specific kinds of $R^1$ to $R^{15}$ and substitution positions of $L^1$, $L^2$, $X^2$ and $X^3$ on the phenylene groups, the contents as described above may be applied.

The compound of a structure such as Formula 1 has a bulky the structure and extended free volume, and represents a suitable process temperature. In addition, since the number of the phthalonitrile structure corresponding to a curable functional group is at least 3, a curing agent to be described below has excellent reactivity.

Accordingly, the compound may have excellent curability, represent an appropriate process temperature and a wide process window, and provide a polymerizable composition and a prepolymer, capable of forming a composite having excellent physical properties.

In one example, the process temperature of the compound may be, for example in a range of 100° C. to 250° C. or 100° C. to 200° C. In the present application, the term process temperature may mean a temperature that exists in a state capable of processing the compound, or the following polymerizable composition or prepolymer containing the same, and the like. Such a process temperature may be, for example, a softening point, a melting temperature (Tm) or a glass transition temperature (Tg). Such a range is advantageous for representing a suitable fluidity and workability, securing a wide process window and realizing a polymerizable composition or prepolymer, capable of forming a composite having excellent physical properties.

The compound of Formula 1 can be synthesized according to a known synthesis method of organic compounds. For example, the compound of Formula 1 may be synthesized by a reaction known as a so-called nitro displacement reaction, for example, a method of reacting a compound comprising a hydroxyl group and a compound comprising a nitrile group in the presence of a basic catalyst.

Also, the phthalonitrile resin may further comprise polymerized units of different phthalonitrile compounds in addition to the polymerized units of the compound of Formula 1. In this case, the type of the phthalonitrile compound which can be selected and used is not particularly limited and a known compound may be applied, which is known to be useful in forming the phthalonitrile resin and controlling its physical properties. Examples of such a compound may include compounds known in U.S. Pat. Nos. 4,408,035, 5,003,039, 5,003,078, 5,004,801, 5,132,396, 5,139,054, 5,208,318, 5,237,045, 5,292,854 or U.S. Pat. No. 5,350,828 and various compounds known in the art in addition to those disclosed in the above documents.

In one example, the phthalonitrile resin may comprise as a main component polymerized units of the compound of Formula 1 or polymerized units of the phthalonitrile compound comprising the compound. The phrase comprising as a main component any component herein may mean the case of comprising the component at least 55%, at least 60%, at least 65%, at least 70%, at least 75%, at least 80%, at least 85%, at least 90% or at least 95% based on weight. The upper limit of the ratio is not particularly limited, and for example, may be 100% or less, less than 100%, 95% or less or 90% or less based on weight.

The polymerized units of the compound of Formula 1 in the phthalonitrile resin, may be polymerized units formed by the reaction of the compound of Formula 1 and a curing agent. In this case, the type of the usable curing agents is not particularly limited, as long as it can be reacted with the compound of Formula 1 to form a polymer, and for example, in the case of being compounds known to be useful in forming a so-called phthalonitrile resin, any compound can be also used. Such a curing agent is known in various documents, including the afore-mentioned US patents.

In one example, as a curing agent, an amine compound such as an aromatic amine compound or a hydroxy compound may be used. In the present application, the hydroxy compound may mean a compound at least intramolecularly comprising one or two hydroxy groups. The curing agent capable of forming a resin by curing the phthalonitrile compound is variously known, and such a curing agent may be mostly applied in the present application.

The present application also relates to a polymerizable composition. The polymerizable composition may comprise the above-described compound of Formula 1. The polymerizable composition may further comprise a curing agent together with the compound of Formula 1.

The type of the curing agents usable in the above is not particularly limited, and for example, a curing agent such as those already described may be used.

A ratio of the curing agent in the polymerizable composition is not particularly limited. The ratio can be controlled so that the desired curability can be secured in consideration of the ratio or the type of curable components such as the compound of Formula 1 included in the composition. For example, the curing agent may be included in about 0.02 moles to 1.5 moles per 1 mole of the compound of Formula 1 contained in the polymerizable composition. However, the ratio is only an example of the present application. Usually, if the ratio of the curing agent increases, the process window tends to be narrow, but if the ratio of the curing agent decreases, the curability tends to be insufficient, and thus considering these points, an appropriate ratio of the curing agent may be selected.

The polymerizable composition of the present application can exhibit an appropriate process temperature and a wide processing window, while having excellent curability.

In one example, the process temperature of the polymerizable composition, that is, the melting temperature or the glass transition temperature may be in the range of 100° C. to 250° C. or 100° C. to 200° C. In this case, the process window of the polymerizable composition, that is, an absolute value of a difference (Tc−Tp) between the process temperature (Tp) and the curing temperature (Tc) of the compound of Formula 1 and the curing agent may be at least 50° C., at least 70° C. or at least 100° C. In one example, the curing temperature (Tc) may be higher than the process temperature. Such a range may be advantageous for ensuring adequate workability, for example, in the process of manufacturing the composite by using the polymerizable composition, as described below. Here, the upper limit of the process window is not particularly limited, but for example, the absolute value of the difference (Tc−Tp) between the process temperature (Tp) and the curing temperature (Tc) may be 300° C. or less, or 200° C. or less.

The polymerizable composition may further comprise various additives, including other phthalonitrile compounds in addition to the compound of Formula 1. Examples of such an additive may be exemplified by fillers such as glass fibers, carbon fibers, graphenes or carbon nanotubes, or dispersants and the like, as described below, without being limited thereto.

In one example, the polymerizable composition may comprise as a main component the compound of Formula 1 or a phthalonitrile compound including the compound. Thus, the polymerizable composition comprises the compound of Formula 1 or the phthalonitrile compound, including the compound, at least 55%, at least 60%, at least 65%, at least 70%, at least 75%, at least 80%, at least 85%, at least 90% or at least 95%, based on weight. The upper limit of the ratio is not particularly limited, and for example, may be 100% or less, less than 100%, 95% or less or 90% or less, based on weight.

The present application is also directed to a prepolymer formed by a reaction of the polymerizable composition, that is, the polymerizable composition containing the compound of Formula 1 and a curing agent.

In the present application, the term prepolymer state may mean a state in which the compound of Formula 1 and the curing agent in the polymerizable composition are reacted to some extent (for example, a state that polymerization of a so-called A or B stage step takes place), or a state that does not reach a completely polymerized state, and represents an appropriate fluidity, for example, is capable of processing a composite, as described below. In one example, the prepolymer state may mean a state in which polymerization of the polymerizable composition has progressed to some extent.

The prepolymer can also exhibit excellent curability, an appropriate process temperature and a wide process window. In addition, the prepolymer can exhibit stability over time even when stored for a long time at room temperature.

For example, the process temperature, for example, the glass transition temperature or the melting temperature, of the prepolymer may be in the range of 100° C. to 250° C. or 100° C. to 200° C. In this case, the absolute value of the difference (Tc–Tp) of the process window, that is, the process temperature (Tp), of the prepolymer and the curing temperature (Tc) of the prepolymer may be 50° C. or more, 70° C. or more or 100° C. or more. In one example, the curing temperature (Tc) may be higher than the process temperature (Tp). For example, such a range may be advantageous for ensuring adequate workability in the process for preparing the composite, as described below, by using the prepolymer. Here, the upper limit of the process window is not particularly limited, but for example, the absolute value of the difference (Tc–Tp) of the process temperature (Tp) and the curing temperature (Tc) may be 300° C. or less, or 200° C. or less.

The prepolymer may further comprise any known additives in addition to the above components. Examples of such an additive may be exemplified by the aforementioned fillers and the like, but is not limited thereto.

The present application also relates to a composite. The composite may comprise the above-described phthalonitrile resin and filler. As described above, it is possible to achieve excellent curability, an appropriate process temperature and a wide process window through the compound of Formula 1 of the present application, and thus it is possible to easily form a so-called reinforced resin composite with excellent physical properties, comprising various fillers. The composite thus formed may include the phthalonitrile resin and the filler, and may be applied to various applications including, for example, durables such as cars, airplanes or ships.

The type of the filler is not particularly limited, and may be suitably selected in consideration of the intended use. The usable filler may be exemplified by a fibrous material such as carbon fibers, aramid fibers, glass fibers or ceramic fibers, or a woven fabric, a non-woven fabric, strings or lines, formed by the fibrous material, or a carbon nanomaterial such as carbon nanotube or graphene, without being limited thereto.

The ratio of the filler is also not specifically limited, and may be set to an appropriate range depending on the intended use.

The present application also relates to a precursor for preparing the composite, and the precursor may comprise, for example, the above-described polymerizable composition and filler or, or may comprise the above-described prepolymer and filler.

A composite may be prepared in a known manner using the precursor. For example, the composite may be formed by curing the precursor.

In one example, the precursor may be prepared in a state where the polymerizable composition including the compound of Formula 1 and the curing agent or the prepolymer formed by pre-curing the polymerizable composition is melted with heating and the like, and if necessary, by combining it with the filler. For example, the above-described composite may be prepared by molding the above-prepared precursor into the desired shape and then curing it. The polymerizable composition or the prepolymer has an appropriate process temperature and a wide process temperature, and has excellent curability, so that in the above process molding and curing can be efficiently performed.

In the above process, the method of forming the prepolymer, etc., and the method of preparing the composite by combining such a prepolymer and the like with the filler, processing and curing them may progress according to known methods.

Advantageous Effects

The present application may provide phthalonitrile, which has excellent curability, exhibits an appropriate process temperature and a wide process window and is capable of forming a composite having excellent physical properties, and a polymerizable composition and a prepolymer, using the same.

BRIEF DESCRIPTION OF DRAWINGS

FIG. 1 is a result of NMR analysis on the compound (PN1) prepared in Preparation Example 1.

FIG. 2 is a result of NMR analysis on the compound (PN2) prepared in Preparation 2.

FIG. 3 is a result of NMR analysis on the compound (PN3) prepared in Preparation Example 3.

FIG. 4 is a result of NMR analysis on the compound (PN3) prepared in Preparation Example 3.

MODE FOR INVENTION

Hereinafter, the phthalonitrile resin will be specifically explained through Examples and Comparative Examples, but the scope of the resin and the like is not limited to the following examples.

1. NMR (Nuclear Magnetic Resonance) Analysis

NMR analyses on the compounds synthesized in Preparation Examples 1 to 3 were performed by using a 500 MHz NMR equipment from Agilent Co. as the manufacturer's manual. Samples for measurement of NMR were prepared by dissolving the compounds in DMSO (dimethyl sulfoxide)-d6.

2. DSC (Differential Scanning Calorimetry) Analysis

The DSC analysis was performed in an N2 flow atmosphere, while elevating the temperature from 35° C. to 450° C. at a rate of temperature rise of 10° C./min using a Q20 system from TA Instrument Co.

3. TGA (Thermogravimetric Analysis) Analysis

The TGA analysis was performed using an equipment of TGA e850 from Mettler-Toledo Co. The compounds prepared in Preparation Examples were analyzed in an N2 flow atmosphere while elevating the temperature from 25° C. to 800° C. at a rate of temperature rise of 10° C./min, and the compositions prepared in Examples or Comparative Examples were analyzed in an N2 flow atmosphere, while elevating the temperature from 25° C. to 900° C. at a rate of temperature rise of 10° C./min after post-curing them at a temperature of 375° C.

Preparation Example 1. Synthesis of Compound (PN1)

38.2 g of a compound of Formula A below (CAS No. 110726-28-8) and 100 mL of DMF (dimethyl formamide) were introduced into a 3-neck RBF (3-neck round-bottom flask), stirred at room temperature and dissolved. 46.7 g of 4-nitro-phthalonitrile of Formula B below was added thereto and 50 g of DMF was added thereto, and then stirred and dissolved. Subsequently, 56.0 g of potassium carbonate and 50 g of DMF were introduced together thereto, and then the temperature was raised to 85° C. with stirring. After reaction for about 5 hours, the reactant was cooled to room temperature. The cooled reaction solution was poured into an aqueous solution of 0.2N hydrochloric acid to be neutralized and precipitated. After filtering, the residue was washed with water. Then, the filtered reactant was dried in a vacuum oven at 100° C. for a day. After removing water and the residual solvent, a compound of Formula C below (PN1) was obtained in a yield of 85% by weight.

reaction for about 5 hours, the reactant was cooled to room temperature. The cooled reaction solution was poured into an aqueous solution of 0.2N hydrochloric acid to be neutralized and precipitated. After filtering, the residue was washed with water. Then, the filtered reactant was dried in a vacuum oven at 100° C. for a day. After removing water and the residual solvent, a compound of Formula E below (PN2) was obtained in a yield of 83% by weight.

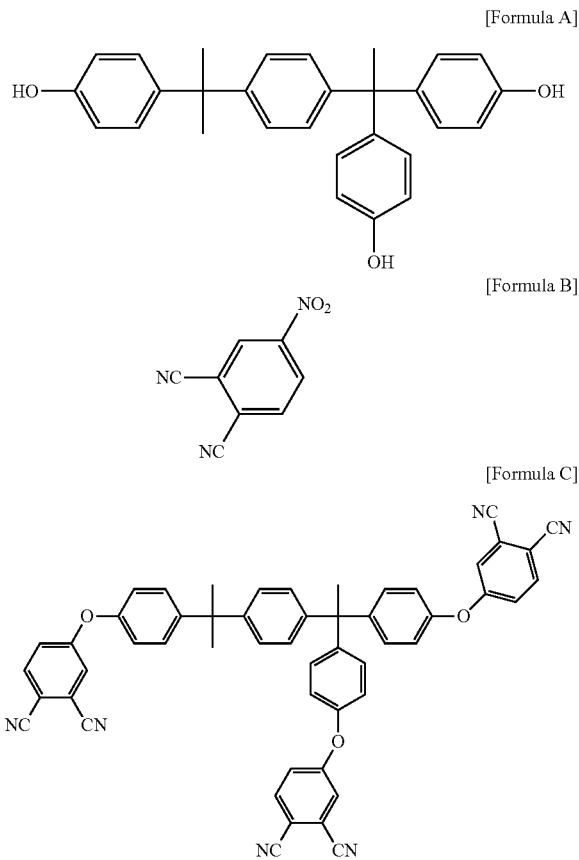

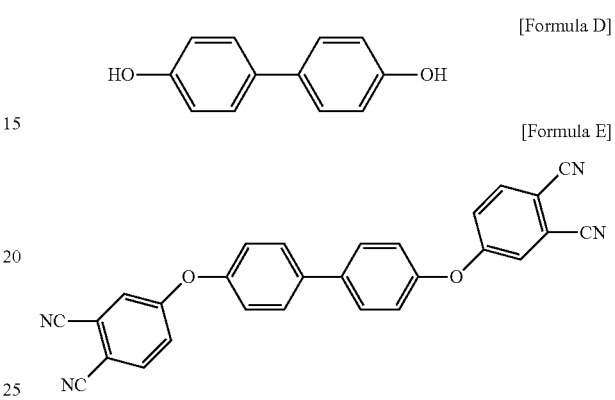

The NMR analysis results on the compound of Formula E are shown in FIG. 2. The analysis results on the compound are summarized in Table 1.

The NMR analysis results on the compound of Formula C are shown in FIG. 1. From the DSC analysis results about the compound of Formula C, its process temperature (softening point) was about 104° C. or so. It could be confirmed that on TGA analysis, the residue at 800° C. represents as high as 42% by weight, and thus it has excellent thermal stability.

Preparation Example 3. Synthesis of Compound (PN3)

50.4 g of a compound of Formula F below and 150 mL of DMF (dimethyl formamide) were introduced into a 3-neck RBF (3-neck round-bottom flask), stirred at room temperature and dissolved. 51.9 g of 4-nitro-phthalonitrile of Formula B used in Preparation Example 1 above was added thereto and 50 g of DMF was added thereto, and then stirred and dissolved. Subsequently, 62.2 g of potassium carbonate and 50 g of DMF were introduced together thereto, and then the temperature was raised to 85° C. with stirring. After reaction for about 5 hours, the reactant was cooled to room temperature. The cooled reaction solution was poured into an aqueous solution of 0.2N hydrochloric acid to be neutralized and precipitated. After filtering, the residue was washed with water. Then, the filtered reactant was dried in a vacuum oven at 100° C. for a day. After removing water and the residual solvent, a compound of Formula G below (PN3) was obtained in a yield of 87% by weight.

Preparation Example 2. Synthesis of Compound (PN2)

27.9 g of a compound of Formula D below and 100 mL of DMF (dimethyl formamide) were introduced into a 3-neck RBF (3-neck round-bottom flask), stirred at room temperature and dissolved. 51.9 g of 4-nitro-phthalonitrile of Formula B used in Preparation Example 1 above was added thereto and 50 g of DMF was added thereto, and then stirred and dissolved. Subsequently, 62.2 g of potassium carbonate and 50 g of DMF were introduced together thereto, and then the temperature was raised to 85° C. with stirring. After

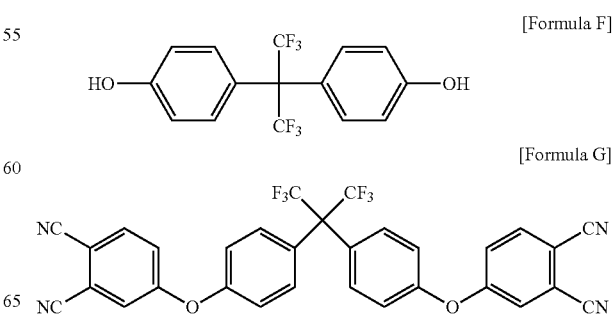

The NMR analysis results on the compound of Formula G are shown in FIG. 3. The analysis results on the compound are summarized in Table 1.

Preparation 4. Synthesis of Compound (PN4)

27.6 g of a compound of Formula H below and 100 mL of DMF (dimethyl formamide) were introduced into a 3-neck RBF (3-neck round-bottom flask), stirred at room temperature and dissolved. 46.7 g of the compound of Formula B used in Preparation Example 1 above was additionally introduced thereto and 50 g of DMF was added thereto, and then stirred and dissolved. Subsequently, 56.0 g of potassium carbonate and 50 g of DMF were introduced together thereto, and then the temperature was raised to 85° C. with stirring. After reaction for about 5 hours, the reactant was cooled to room temperature. The cooled reaction solution was neutralized with an aqueous solution of 0.2N hydrochloric acid to be precipitated, filtered and then washed with water. Then, the filtered reactant was dried in a vacuum oven at 100° C. for a day. After removing water and the residual solvent, a compound of Formula I below (PN4) was obtained in a yield of about 87% by weight.

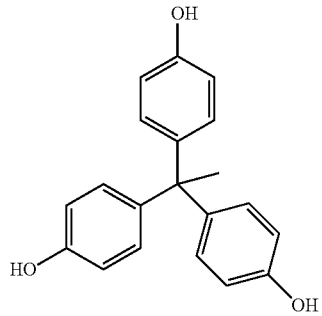

[Formula H]

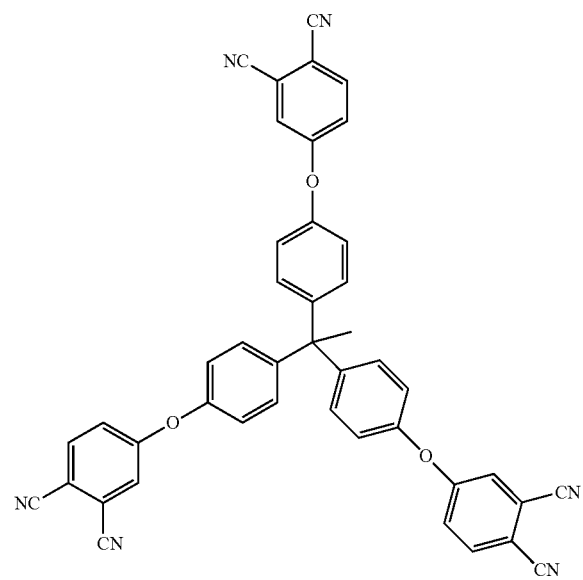

[Formula I]

The NMR analysis results on the compound of Formula I are shown in FIG. 4. The analysis results on the compound are summarized in Table 1.

Preparation Example 5. Synthesis of Compound (CA1)

A commercial product from TCI (Tokyo Chemical Industry Co., Ltd.) was obtained as a compound of Formula J below (CA1) and used without further purification.

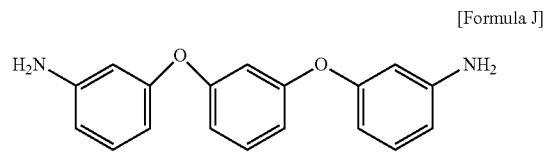 [SMILES: Nc1cccc(Oc2cccc(Oc3cccc(N)c3)c2)c1]

[Formula J]

DSC and TGA analysis results on the compounds (PN1, PN2, PN3, PN4) of Preparation Examples 1 to 4 are summarized in Table 1 below.

TABLE 1

|  |  | Process temperature (° C.) | Residue (%) at 800° C. |
|---|---|---|---|
| Preparation Example 1 | PIN 1 | 104 | 42 |
| Preparation Example 2 | PIN 2 | 235 | 1.1 |
| Preparation Example 3 | PIN 3 | 231 | 0 |
| Preparation Example 4 | PIN 4 | 217 | 38 |

Example 1

To the compound of Formula C (PN1) in Preparation Example 1, 6 mol % of the compound of Preparation Example 5 (CA1) was added compared to the usage of the compound of Formula C and mixed well to prepare a polymerizable composition. Results performing DSC and TGA analyses on the composition are described in Table 2 below. A prepolymer can be prepared by melting the polymerizable composition at 150° C. and stirring it for 5 minutes.

Comparative Example 1

To the compound of Formula E (PN2) in Preparation Example 2, 6 mol % of the compound of Preparation Example 5 (CA1) was added compared to the usage of the compound of Formula E and mixed well to prepare a polymerizable composition. Results performing DSC and TGA analyses on the composition are described in Table 2 below. A prepolymer can be prepared by melting the polymerizable composition at 240° C. and stirring it for 5 minutes.

Comparative Example 2

To the compound of Formula G (PN3) in Preparation Example 3, 6 mol % of the compound of Preparation Example 5 (CA1) was added compared to the usage of the compound of Formula G and mixed well to prepare a polymerizable composition. Results performing DSC and TGA analyses on the composition are described in Table 2 below. A prepolymer can be prepared by melting the polymerizable composition at 240° C. and stirring it for 5 minutes.

Comparative Example 3

To the compound of Formula I (PN4) in Preparation Example 4, 6 mol % of the compound of Preparation Example 5 (CA1) was added compared to the usage of the compound of Formula I and mixed well to prepare a polymerizable composition. Results performing DSC and TGA analyses on the composition are described in Table 2 below. A prepolymer can be prepared by melting the polymerizable composition at 240° C. and stirring it for 5 minutes.

Results performing DSC and TGA analyses on the compositions of Example and Comparative Examples are described in Table 2 below.

TABLE 2

| | Process temperature (° C.) | Exothermal onset temperature (° C.) | Process window (° C.) | Residue (%) at 900° C. |
|---|---|---|---|---|
| Example 1 | 103 | 275 | 172 | 73 |
| Comparative Example 1 | 233 | 263 | 30 | 64 |
| Comparative Example 2 | 230 | 280 | 50 | 52 |
| Comparative Example 3 | 218 | 258 | 40 | — |

It can be confirmed from the results of Table 2 that when the compound of Formula 1 of the present application is used, the composition exhibit a significantly wide process window, while showing a low process temperature compared to Comparative Examples.

That is, the case of Example 1 using the compound of a structure in which m and n in Formula 1 are 1, while having three phthalonitrile groups, has much lower process temperature compared to the cases of Comparative Examples 1 and 2 having two phthalonitrile groups, and thus it can be confirmed that a prepolymer may be prepared at a low temperature, a wide process window of 100° C. or more and it shows a good heat-resistant property.

In addition, although the case of Comparative Example 3 has three phthalonitrile groups as in the case of Example 1, crystallinity increased due to symmetry of the core part structure and accordingly the process temperature highly increased, so that the process window was confirmed to be very narrow.

The invention claimed is:

1. A phthalonitrile resin comprising polymerized units formed by polymerization or curing of a compound of Formula 1 below:

[Formula 1]

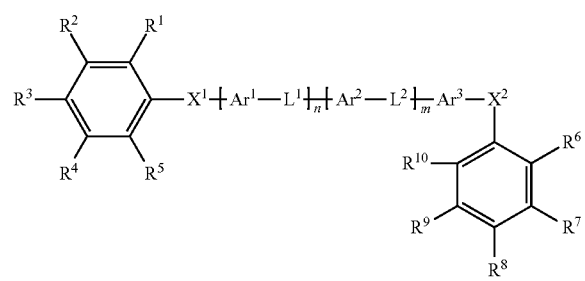

wherein $R^1$ to $R^{10}$ are each independently hydrogen, an alkyl group, an alkoxy group, an aryl group, or a cyano group, provided that at least two of $R^1$ to $R^5$ are a cyano group and at least two of $R^6$ to $R^{10}$ are a cyano group, $X^1$ and $X^2$ are each independently an alkylene group, an alkylidene group, an oxygen atom or a sulfur atom, $Ar^1$, $Ar^2$ and $Ar^3$ are the same or different aromatic divalent radical from one another, n is a number of 1 or more, m is a number of 1 or more, $L^1$ is an alkylene group or an alkylidene group, and $L^2$ is an alkylene group or an alkylidene group, substituted with a monovalent radical of Formula 2 below:

[Formula 2]

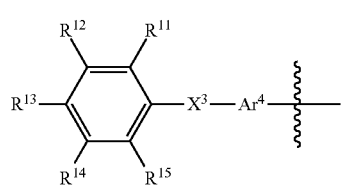

wherein $R^{11}$ to $R^{15}$ are each independently hydrogen, an alkyl group, an alkoxy group, an aryl group, or a cyano group, provided that at least two of $R^{11}$ to $R^{15}$ are a cyano group, $X^3$ is an alkylene group, an alkylidene group, an oxygen atom or a sulfur atom, and $Ar^4$ is an aromatic divalent radical.

2. The phthalonitrile resin according to claim 1, wherein in Formula 1, $R^1$ to $R^{10}$ are each independently hydrogen or an alkyl group, provided that at least two of $R^1$ to $R^5$ are a cyano group and at least two of $R^6$ to $R^{10}$ are a cyano group.

3. The phthalonitrile resin according to claim 1, wherein in Formula 1, $R^3$, $R^4$, $R^8$ and $R^9$ area cyano group and $R^1$, $R^2$, $R^5$, $R^6$, $R^7$ and $R^{10}$ are each independently hydrogen or an alkyl group.

4. The phthalonitrile resin according to claim 1, wherein in Formula 1, $Ar^1$, $Ar^2$ and $Ar^3$ are phenylene.

5. The phthalonitrile resin according to claim 4, wherein in $Ar^1$ of Formula 1, a substitution position of $L^1$ is a para position based on $X^1$, in $Ar^2$ of Formula 1, a substitution position of $L^2$ is a para position based on $L^1$, and in $Ar^3$ of Formula 1, a substitution position of $X^2$ is a para position based on $L^2$.

6. The phthalonitrile resin according to claim 1, wherein in Formula 1, n is a number in a range of 1 to 10 and m is a number in a range of 1 to 10.

7. The phthalonitrile resin according to claim 1, wherein in Formula 2, $R^{11}$ to $R^{15}$ are each independently hydrogen or an alkyl group, provided that at least two of $R^{11}$ to $R^{15}$ are a cyano group.

8. The phthalonitrile resin according to claim 1, wherein in Formula 2, $R^{13}$ and $R^{14}$ are a cyano group and $R^{11}$, $R^{12}$ and $R^{15}$ are each independently hydrogen or an alkyl group.

9. The phthalonitrile resin according to claim 1, wherein in Formula 2, $Ar^4$ is phenylene.

10. The phthalonitrile resin according to claim 9, wherein in $Ar^4$ of Formula 2, a substitution position of $X^3$ is a para position based on a site linked to $L^2$ of Formula 1.

11. The phthalonitrile resin according to claim 1, wherein in Formula 1, $X^1$ and $X^2$ are an oxygen atom, $Ar^1$, $Ar^2$ and $Ar^3$ are a phenylene group, n is 1 or 2 and m is 1 or 2, and in Formula 2, $Ar^4$ is a phenylene group and $X^3$ is an oxygen atom.

12. A polymerizable composition comprising a compound of Formula 1 below and a curing agent:

[Formula 1]

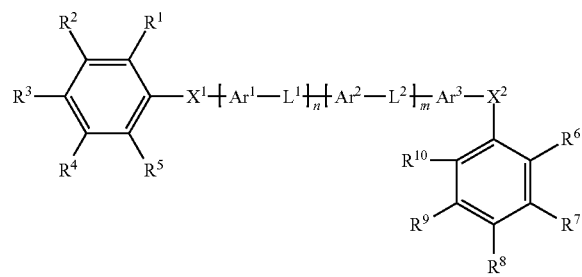

wherein $R^1$ to $R^{10}$ are each independently hydrogen, an alkyl group, an alkoxy group, an aryl group, or a cyano group, provided that at least two of $R^1$ to $R^5$ are a cyano group and at least two of $R^6$ to $R^{10}$ are a cyano group, $X^1$ and $X^2$ are each independently an alkylene group, an alkylidene group, an oxygen atom or a sulfur atom, $Ar^1$, $Ar^2$ and $Ar^3$ are the same or different aromatic divalent radical from one another, n is a number of 1 or more, m is a number of 1 or more, $L^1$ is an alkylene group or an alkylidene group, and $L^2$ is an alkylene group or an alkylidene group, substituted with a monovalent radical of Formula 2 below:

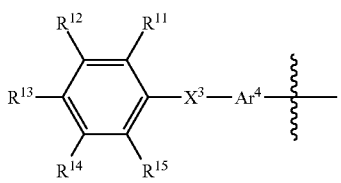

[Formula 2]

wherein $R^{11}$ to $R^{15}$ are each independently hydrogen, an alkyl group, an alkoxy group, an aryl group, or a cyano group, provided that at least two of $R^{11}$ to $R^{15}$ are a cyano group, $X^3$ is an alkylene group, an alkylidene group, an oxygen atom or a sulfur atom, and $Ar^4$ is an aromatic divalent radical.

13. The polymerizable composition according to claim 12, wherein a process temperature is in a range of 100° C. to 250° C. and an absolute value of a difference of said process temperature and a curing temperature (Tc) is 50° C. or more.

14. A prepolymer being a reactant of the polymerizable composition of claim 12.

15. The prepolymer according to claim 14, wherein a process temperature is in a range of 100° C. to 250° C. and an absolute value of a difference of said process temperature and a curing temperature (Tc) is 50° C. or more.

16. A composite comprising the phthalonitrile resin of claim 1.

17. The composite according to claim 16, further comprising a filler.

18. The composite according to claim 17, wherein the filler is a fibrous material or a carbon nanomaterial.

19. A precursor comprising the polymerizable composition of claim 12.

20. A method for preparing a composite comprising a step of curing the precursor of claim 19.

* * * * *